United States Statutory Invention Registration [19]

[11] Reg. Number: H654

Doyle, Jr. et al. [43] Published: Jul. 4, 1989

[54] POSITIVE VIGNETTING ACCESSORY

[75] Inventors: Edward J. Doyle, Jr., Plympton; Donald E. Mauchan, Marlboro, both of Mass.

[73] Assignee: Polaroid Corporation, Cambridge, Mass.

[21] Appl. No.: 198,832

[22] Filed: May 26, 1988

[51] Int. Cl.[4] ..... G03B 11/00

[52] U.S. Cl. ..... 354/296

[56] References Cited

U.S. PATENT DOCUMENTS

| | | | |
|---|---|---|---|
| 425,812 | 4/1890 | Lloyd . | |
| 2,972,931 | 2/1961 | Roob . | |
| 3,528,737 | 9/1970 | Denner | 355/67 |
| 4,508,440 | 4/1985 | Costa et al. | 354/187 |
| 4,007,471 | 2/1977 | Land et al. | 354/295 |
| 4,107,716 | 8/1978 | Pfefer | 354/296 |
| 4,268,146 | 5/1981 | Johnson | 354/145 |
| 4,304,471 | 12/1981 | Jones | 354/108 |
| 4,436,400 | 3/1984 | Charis et al. | 354/296 |
| 4,639,109 | 1/1987 | Hudspeth | 354/295 |
| 4,707,106 | 11/1987 | Johnson et al. | 354/481 |
| 4,717,930 | 1/1988 | Wheeler | 354/108 |

OTHER PUBLICATIONS

Scope Industries, Ltd. advertisement copyrighted 1986.

*Primary Examiner*—Stephen C. Buczinski
*Assistant Examiner*—Linda J. Wallace
*Attorney, Agent, or Firm*—David R. Thornton

[57] ABSTRACT

A positive vignetting accessory having a simple, lightweight snap-on plastic construction and adapted for use with a camera having a flash unit. The positive vignetting accessory diverts a portion of the flash illumination produced during a normal flash exposure cycle and directs this diverted illumination in a selected pattern toward the camera lens to effect positive vignetting.

10 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POSITIVE VIGNETTING ACCESSORY

BACKGROUND OF THE INVENTION

This invention relates to photographic apparatus and, more particularly, it concerns an apparatus for positive photographic vignetting.

Both negative and positive vignetting are known photographic techniques used to set off a particular image region of a photograph by either darkening, lightening, coloring or blurring the area around the image region. For example, negative vignetting using either an opaque, colored or translucent mask in front of an objective lens of a camera to obstruct or reduce transmission of scene light to a selected portion of an exposure is disclosed in U.S. Pat. No. 4,107,716 issued to Irving Pfefer. Negative vignetting may also be accomplished by placing an opaque or translucent template or transparency at the focal plane and adjacent the film within a camera as disclosed for example in U.S. Pat. No. 4,304,471 issued to Mary R. Jones.

Positive vignetting generally entails transmitting diffused light to a region of the film corresponding to the desired vignetted portion to increase non-imaging illumination of this region as disclosed in U.S. Pat. Nos. 425,812 issued to Hamlin I. Lloyd on Apr. 15, 1890 and 3,528,737 issued to James R. Denner on Sept. 15, 1970. Additionally, it is known to introduce auxiliary light to this region to provide increased illumination to the vignetted portion or to gradually fade the subject image into a light background. As disclosed in U.S. Pat. No. 2,972,931 issued to Walter J. Roob, positive vignetting may be accomplished using a set of auxiliary light bulbs and a vignette in the bellows of an enlarger. As disclosed in U.S. Pat. No. 4,436,400 issued to Phillip S. Charis et al, positive vignetting is produced by the addition of an auxiliary light source and vignette apparatus to a camera lens. Positive vignetting in conjuction with an image carrying template has also been provided to produce a composite image, by utilizing a thick transparent plate affixed on and covering the full face of a camera, and extending between a vignetting aperture over the lens to the camera strobe to light pipe strobe illumination to the plate aperture.

There exists a need for a simple, lightweight positive vignette producing apparatus which does not require the use of an auxiliary light source other than an existing flash unit.

SUMMARY OF THE INVENTION

In accordance with the present invention, a snap-on positive vignetting accessory for use with a camera having a flash unit provides for diversion of a portion of flash illumination and direction of the diverted illumination in a predetermined pattern toward a camera lens to effect positive vignetting.

In accordance with one embodiment of the invention, a positive vignetting accessory is an integral unit made up of a light diverting formation connected to a light piping plate having an exposure aperture and a pair of attachment members. The attachment members are received in a snap-on accessory clip so as to hold the positive vignetting accesory in an operative position.

In accordance with another embodiment of the present invention, a positive vignetting accessory is an integral snap-on unit including a flash illumination diverting formation, a light piping plate, a light piping arm transmitting light between the diverting formation and the light piping plate, and a snap-on assembly. The snap-on assembly is made up of a pair of ribs and a resilient latch member which cooperate with corresponding camera structure to firmly and yet releasably attach the positive vignetting accessory.

In accordance with yet another embodiment of the present invention, a positive vignetting accessory is made up of a vignetting tube, a reflector element and an attachment member for operatively locating the vignetting tube in front of a camera objective lens and the reflector element adjacent an electronic flash for diverting only a portion of flash illumination to the vignetting tube.

A principal object of the present invention is the provision of a relatively simple snap-on positive vignetting accessory for use with a camera having a built-in electronic flash. A further object of the present invention is the provision of a positive vignetting accessory which may be used in combination with an existing snap-on accessory clip.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

Figure 1:
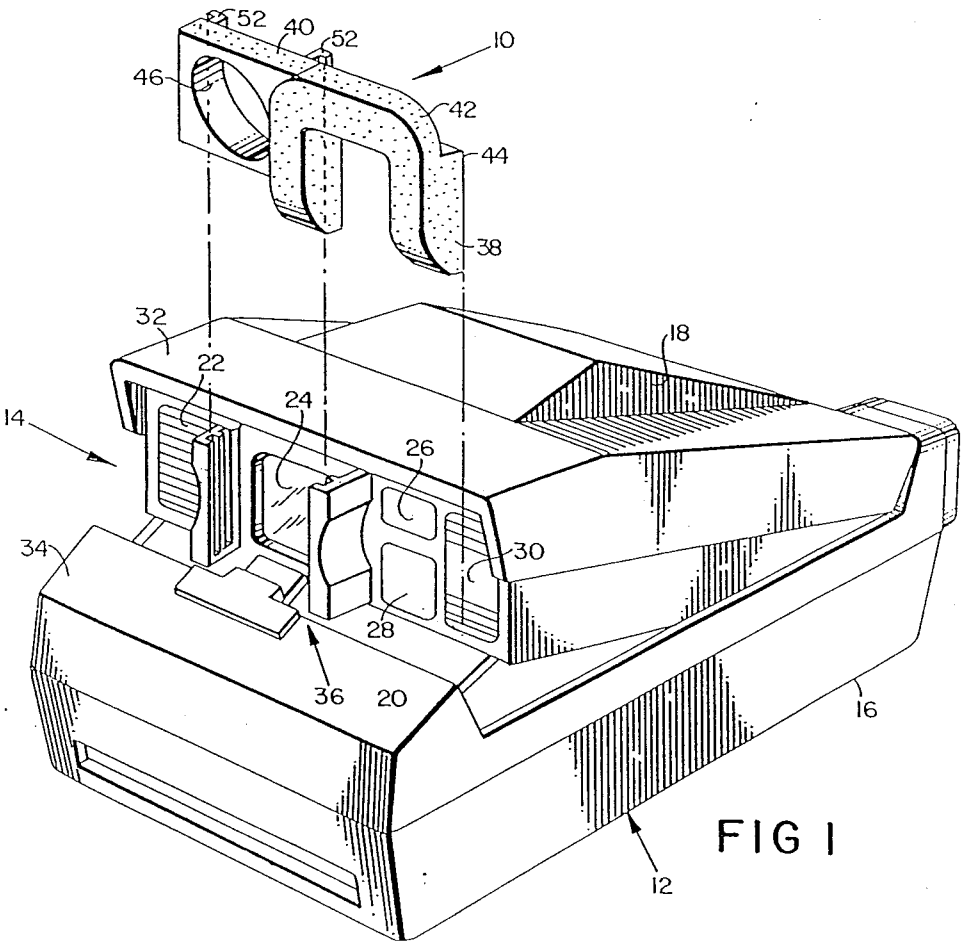
FIG. 1 is an exploded perspective illustration of a camera, a snap-on accessory clip and a positive vignetting accessory in accordance with one embodiment of the present invention.

In FIG. 1 of the drawings and in accordance with one embodiment of the invention, a positive vignetting accessory 10 is shown together with an instant picture type photographic camera 12 and a snap-on accessory clip 14. The camera 12, such as one of the "7000 Series" cameras marketed by Polaroid Corporation of Cambridge, Massachusetts and described in greater detail in U.S. Pat. No. 4,508,440 issued to Peter F. Costa et al, assigned to the same assignee as the present invention and now incorporated by reference herein. The camera 12 includes a lower housing portion 16 and an upper housing portion 18 pivotally mounted on the lower housing portion 16 for movement between a raised or open operative position (FIG. 1) and a closed and inoperative position (not shown). The upper housin portion 18 includes a component module 20 made up of a sonar type rangefinder 22, a lens assembly 24, a photocell window 26, a viewfinder window 28 and an electronic flash or strobe 30.

Figure 5:
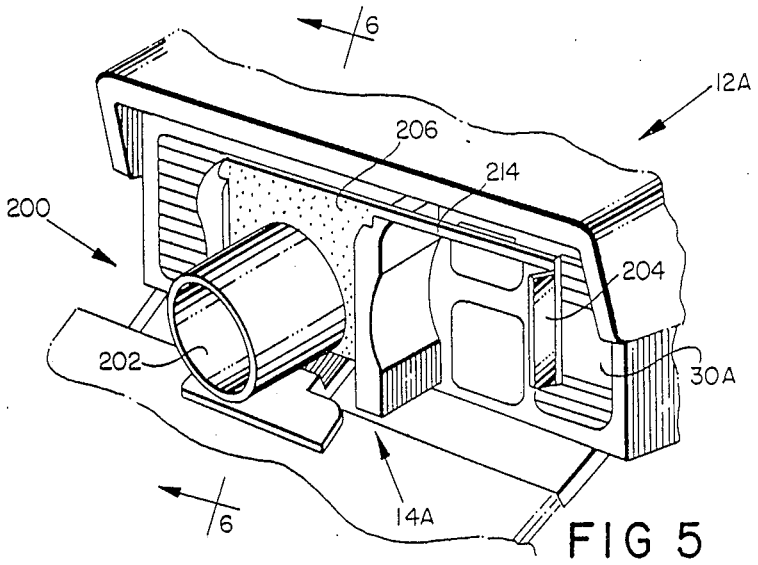
FIG. 5 is a perspective illustration of a camera, a snap-on accessory clip and a positive vignetting accessory in accordance with a third embodiment of the present invention.
Figure 6:
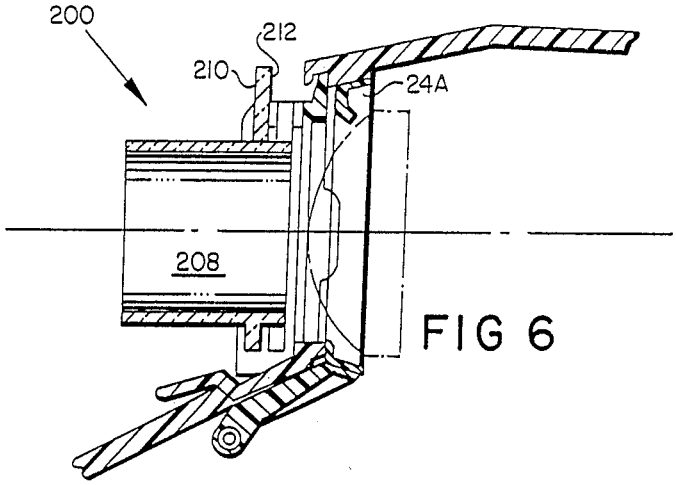
FIG. 6 is an enlarged cross-section representation on line 6—6 of FIG. 5.

The snap-on accessory clip 14 is of the type fully described in U.S. Pat. No. 4,639,109 issued to William Hudspeth, assigned to the same assignee as is the present invention, and now incorporated by reference herein. The accessory clip 14 is operatively positioned directy in front of and centered on lens assembly 24. The accessory clip 14 as shown in FIGS. 1, 5 and 6 is placed between a top wall 32 of upper housing portion 18 andslanting end wall 34 of the lower housing portion 16. The accessory clip 14 is releasably locked into position by a flexible and resilient cantilevered release member 36.

For the sake of clarity, the positive vignetting accessory 10 is shown in FIG. 1 in a position above the camera 12. It is to be understood, however, that when in use, the positive vignetting accessory 10 is located directly in front of the component module 20. The positive vignetting accessory 10 includes a flash diverting formation 38, a light piping plate 40, and a light piping arm 42 connecting the diverting formation 38 and the light piping plate 40. The light piping arm 42 is shaped to connect the light diverting formation 38 to the light piping plate 40 without obstructing the passage of scene light to the photocell window 26 and viewfinder window 28.

Figure 2:
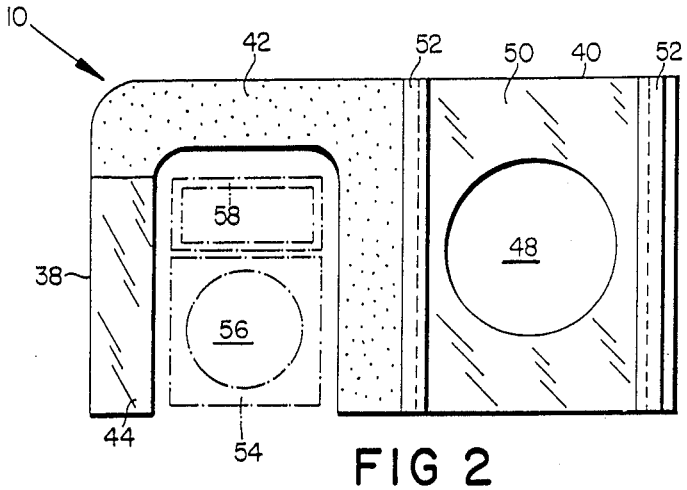
FIG. 2 is an expanded rear elevation of the positive vignetting accessory of FIG. 1.

As shown in FIG. 2, the flash diverting formation 38 has a polished, light transmitting (i.e., transparent) light entering surface 44 which covers only a portion of the electronic flash 26 when the positive vignetting accessory 36 is in an operative position.

The light piping plate 40 has a central polished and transparent, cylindrical light exiting surface 46 defining a circular exposure aperture 48. The size of the aperture 48 determines the size of the resulting principal image and the area of a resulting photo which is a positive vignetted shading or border. More importantly, the light piping plate 40 has a polished, light transmitting (i.e., transparent) light exiting rear surface 50 and a pair of attachment members 52. The attachment members 52 are configured to be inserted into corresponding accessory receiving channels in the accessory clip 14.

The positive vignetting accessory 10 is made as an integral unit from a light transmitting plastic material, such as polycarbonate or acrylic, having good light piping characteristics. As shown in FIG. 1, the outer surface of the positive vignetting accessory 10 with the exception of the light entering and light exiting surfaces 44, 46 and 50, respectively, is roughened to reduce light loss and improve the light piping effect. The roughened outer surface may also be made reflective or white particularly in the area overlying the lens assembly 24 by, for example, screen printing or a diffusion process. Further, a diffusion process may be used to decrease the index of refraction of the outer surfaces of the positive vignetting accessory 10 in order to increase the light piping character of the positive vignetting accessory 10.

As shown in phantom in FIG. 2, the positive vignetting accessory 10 may be used with a viewfinder window mask 54 having an aperture 56 to permit proper framing of a subject. The size and shape of the opening 56 in the viewfinder window mask 54 corresponds in a reduced fashion to the size and shape of the exposure aperture 48 in the light piping plate 40. The positive vignetting accessory 10 may also be used together with a tube or pipe type element 58 for extending the photocell view to the exterior of the positive vignetting accessory 10. Such a photocell view extension 58 could be made of the same material as the accessory 36, but would have a blackened surface in order to exclude any flash illumination reflected by the diverting formation 38 and light entering surface 44 from directly impinging upon the photocell window 26. Alternatively, the viewfinder window mask 54 and photocell view extension 58 may, for example, be formed from an opaque plastic material and include resilient members for allowing the mask 54 and extension 58 to be press fit into the positive vignetting accessory 10 so as to be held in a proper position. In yet another example, the viewfinder window mask 54 and the photocell view extension 58 may be molded with the rest of the positive vignetting accessory 10 as an integral one piece plastic unit.

Although the positive vignetting accessory 10 is shown in FIGS. 1 and 2 as a separate element from the accessory clip 14, it is contemplated that the positive vignetting accessory 10 and the accessory clip 14 may, instead, be fixed together or molded in a combined form as a single snap-on positive vignetting accessory unit having a release mechanism similar to the release mechanism 34 of the accessory clip 14.

The positive vignetting accessory 10 of FIGS. 1 and 2 is used in the following manner. First, the upper housing portion 18 of the camera 12 is placed in its raised or open position as shown in FIG. 1. then the accessory clip 14 is snapped into place in its operative position in front of the lens assembly 24. Next, the positive vignetting accessory attaching members 52 are slid down into corresponding receiving channels in the accessory clip 14 until the attachment members 52 are received fully in the corresponding channels in the accessory clip 28.

The positive vignetting accessory 10 may be used in conjunction with a negative or subtractive vignetting focal plane transparency or template (not shown). Such a transparency or template is placed in an exposure opening in a film pack before the film pack is inserted into the lower housing portion 16 of the camera 12.

An appropriate mask 54 may be attached to the positive vignetting accessory 10 so as to cover a portion of the viewfinder window 28 corresponding to the portion of the field of view of the objective lens assembly 24 blocked by the light piping plate 40. The mask 54 may also include a design or information corresponding to the design or information on a focal plane transparency or template so as to give the camera operator a representation of the resulting exposure image.

When a subject is properly framed in the camera viewfinder, an exposure cycle is initiated and a flash is produced by the electronic flash 30 to illuminate the subject. A portion of the flash illumination passes into the light diverting formation 38 through the light entering surface 44. This diverted illumination passes through the light piping arm 42 to the light piping plate 40 and exits through the light exiting surfaces 46 and 50 to provide (in conjunction with the centrally located subject exposure) a positive vignetting exposure of a film unit. When the positive vignetting accessory 36 is used in conjunction with a focal plane transparency or template, the illumination from the light exiting surfaces 46 and 50 provides enhanced exposure of the film plane transparency or template.

When the camera shutter within the lens assembly 24 opens, the lens focuses on the subject through the accessory aperture 48 such that the camera provides both an out-of-focus exposure of the rear surface 50 of the light piping plate 40 and an exposure of the subject.

The vignetting exposure portion of a film unit produced by the positive vignetting accessory 10 serves to essentially expose the area of the film unit around the subject area exposed through the aperture 48 to obtain a desired background or border shading. Further, the positive vignetting accessory 10 acts as a focal plane template or transparency illuminator and as such contributes increased illumination to the outer portion of the picture or information on the template or transparency.

Figure 4:
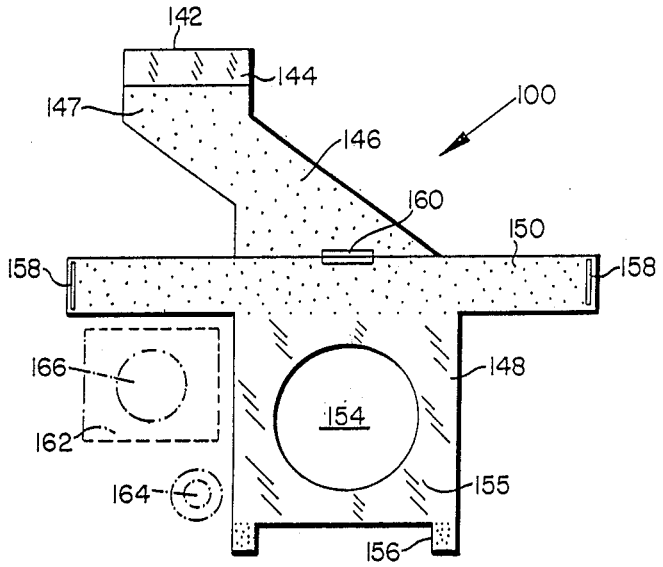
FIG. 4 is an enlarged rear elevation of the positive vignetting accessory of FIG. 3.
Figure 3:
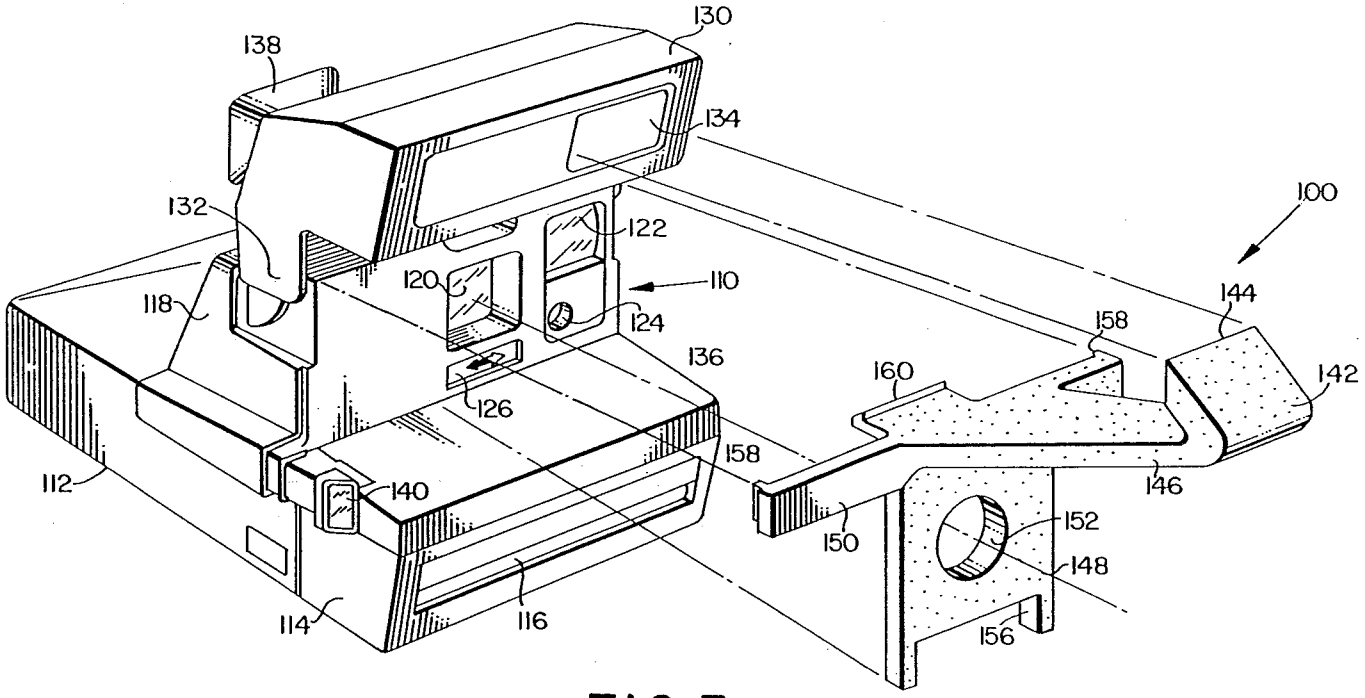
FIG. 3 is an exploded perspective representation of a camera and a snap-on positive vignetting accessory in accordance with a second embodiment of the present invention.

In accordance with a second embodiment of the present invention and as shown in FIGS. 3 and 4, a snap-on positive vignetting accessory 100 is used in conjunction with a camera 110 such as one of the "600 Series" cameras marketed by Polaroid Corporation of Cambridge, Massachusetts and as more fully described in U.S. Pat. Nos. 4,268,146 and 4,707,106 issued to Bruce K. Johnson et al, assigned to the same assignee as the present invention, and now incorporated by reference herein.

The camera 110 includes a base portion 112 for accommodating a film pack (not shown) loaded through a forward pivoting door portion 114. Each successive exposed film unit of the film pack exits the camera 110 through a film unit exit slot 116. The camera 110 also includes an upper shutter housing section 118 which supports an objective lens 120, a viewfinder lens 122, a photocell window 124, an exposure adjustment slide 126 and an exposure initiating push button 140. The shutter housing section 118 pivotally supports an electronic flash unit 130 via a pair of flash unit side walls 132. As shown in FIG. 3, the flash unit 130 is in an operative or raised position. When the camera is not in use, the flash unit 130 may be pivoted to a lower inoperative position (not shown) whereat a flash emitting assembly is located against an apron wall 136. The shutter housing section 118 also supports a rearwardly facing viewfinder eyepiece 138.

The snap-on positive vignetting accessory 100 may be constructed of the same or similar material as accessory 10 and includes a flash illumination diverting formation 142 having a polished and transparent light entering surface 144 located so as to receive only a portion of the flash illumination produced by flash emitting assembly 134. A light piping arm 146 connects the light diverting formation 142 to a light piping plate 148, and includes a necked-down portion 147 to enhance the light piping function.

The light piping plate 148 has an upper snap-on attachment section 150, an intermediate polished and transparent light exiting surface 152 defining an exposure aperture 154, a polished and transparent light exiting rear surface 155, and a lower cutout 156. The snap-on section 150 includes a pair of ribs 158 and a resilient cantilevered latch element 160. As noted in regard to the accessory 10, the surfaces of the accessory 100, except for the light entering surface 144 and the light exiting surfaces 152 and 155, are preferably roughened or otherwise made to provide internal reflection to reduce light loss from these areas. Further, the exiting surface 152, defining the scene exposure aperture 154 may include a roughened surface. Moreover, similar to the accessory 100, the forwardly facing surfaces of the accessory 10, particularly the forwardly facing surface of the light piping plate 148, may be painted white or otherwise made reflective to increase the efficiency of the system and the amount of light exiting the light exiting surface 154.

For the sake of clarity, the snap-on positive vignetting accessory 100 is shown in FIG. 3 separated from the camera 110. It is to be understood, however, that in use, the positive vignetting accessory 100 is located adjacent the front surface of the shutter housing section 118 with the aperture 154 overlying and centered on the objective lens 120 and the diverting element 142 located in front of a lower edge portion of flash emitting assembly 134. When the accessory 100 is attached to the camera 110, the ribs 158 of the attachment section 150 are located just inside the flash unit support walls 132 and latch member 160 is snapped into a corresponding recess (not shown) in the lower surface of the flash unit 130.

The positive vignetting accessory 100 is preferably configured so as to not block the passage of scene light to viewfinder lens 122 and photocell window 124. Further, the light piping plate 148 has a cutout 156 to provide a camera operator with a clear view of, and access to, the exposure adjustment slide 126.

As shown in phantom in FIG. 4, the positive vignetting accessory 100 may be used together with a viewfinder lens mask 162 and a photocell view extension 164. An aperture 166 in the viewfinder lens mask 162 corresponds on a reduced scale to the shape and size of the exposure aperture 154 defined by the light exiting surface 152 of the light piping plate 148 so as to permit proper framing of a subject. The photocell view extension 164 is, for example, a transparent cylinder having a blackened inner or outer surface to prevent flash illumination reflected by the light diverting formation 142 and light entering surface 144 from directly contributing to the scene light received by the photocell window 124. Alternatively, the viewfinder mask 162 and photocell view extension 164 may, for example, be formed from an opaque plastic material and attached to the positive vignetting accessory 100 by gluing or welding. In still yet another example, the mask 162 and extension 164 may be molded as an integral part of the positive vignetting accessory 100.

The positive vignetting accessory 100 of FIGS. and 4 is used in much the same fashion as the positive vignetting accessory 10 of FIGS. 1 and 2. First, the flash unit 130 is pivoted to its raised and operative position shown in FIG. 3. Then, the positive vignetting accessory 100 is snapped onto the face of the shutter housing section 118.

If the positive vignetting accessory is to be used in conjunction with a focal plane transparency or template, such a transparency or template is inserted in the exposure opening of a film pack prior to loading the film pack through the pivoted door 114 into the base 12. The viewfinder lens mask 162 may include a reduced scale image of the design or information on the transparency or template so that the camera operator has a good idea of the composite image that an exposure will produce.

An exposure cycle is initiated by depression of push button 140 after the camera operator has properly framed a subject using the viewfinder eyepiece 138. A portion of the flash illumination produced by the flash assembly 134 passes through the light entering surface 144 and is light piped to the light exiting surfaces 152 and 155. With the exception of the light entering surface 144 and light exiting surfaces 152 and 155, the outer surfaces of the transparent plastic material which forms the positive vignetting accessory 100 have been roughened and made reflective or white to improve the light piping effect.

As described above with respect to the operation of the positive vignetting accessory 10 of FIGS. 1 and 2, the diverted and redirected flash illumination provided by the light exiting surfaces 152 and particularly surface 155 to the objective lens 120 produce a positive vignetting exposure and provide additional, diffused illumination to a focal plane template or transparency exposure if such is used.

In accordance with a third embodiment of the present invention as shown in FIGS. 5 and 6, a positive vignetting accessory 200 is used in combination with a camera 12A and an accessory clip 14A of the same make as the camera 12 and clip 14 of FIG. 1. The positive vignetting accessory 200 is made up of a polished and light transmitting vignetting tube 202, a reflector element 204 such as a mirror or prism and a planar attachment and support member 206 which supports both the tube 202 and reflector element 204.

The inner surface of the vignetting tube 202 defines a vignetting aperture 208. The tube 202 is of sufficient length to receive flash illumination diverted by the reflector element 204 from the electronic flash 30A. The tube 202 catches this diverted illumination and directs it into a lens assembly 24A to produce positive vignetting.

The support and attachment member 206 is formed of any suitable support material and includes an extension or arm portion 214 which supports the reflective element 204 at its extremity. The support member 206 has sufficient width and thickness dimensions to provide a snug fit within corresponding receiving channels in the accessory clip 14A.

The reflective element 204, as shown in FIG. 5, is a small rectangular plastic element having reflective surfaces and being either glued, welded or pivotally connected to the end of the arm 214. Alternatively, the reflective element may be a prism or a pair of prisms for diverting a portion of the illumination produced by the electronic flash 30A to the vignetting tube 202.

The positive vignetting accessory 200 is used in the same fashion as the positive vignetting accessory 10 of FIGS. 1 and 2. Further, the positive vignetting accessory 200 may be used in combination with the viewfinder window mask 54 and the photocell view extension 58 of FIG. 2.

Figure 7:
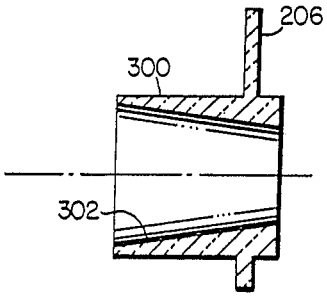
FIG. 7 is a fragmentary cross-section of a modified version of the positive vignetting accessory of FIG. 6.
Figure 8:
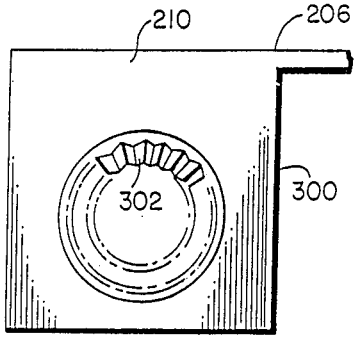
FIG. 8 is a partial front elevation illustration of the positive vignetting accessory of FIG. 7.

As shown in FIGS. 7 and 8, the positive vignetting accessory 200 has been modified to incorporate a vignetting tube 300 having a tapered and fluted inner surface 302 in place of the vignetting tube 202. The vignetting tube 300 and the support and attachment member 206 may be formed as a single, integral molded element formed from a transparent plastic material.

The fluting on the inner surface 302 of the vignetting tube 300 provides a gradual transition between and eliminates any sharp delineation at the border of the image area and vignetted area of a photo, whereas the tapered inner surface 302 provides a reduced opening adjacent the lens assembly 24A in order to uniformly distribute the positive vignetting illumination and reduce flash or hot spots on a resulting photo.

Although the positive vignetting accessory 200 of FIGS. 5 and 6 is shown in combination with the "7000 Series" camera of FIG. 1, it is readily apparent that by modifying the support member 206 such a positive vignetting accessory having a vignetting tube 202 and reflective member 204 may be used with the "600 Series" camera of FIG. 3.

It is contemplated that the design of the positive vignetting accessories of FIGS. 1–3 and 5 may be modified for use with a self-developing camera having a flash unit socket for insertion of a disposable flash unit as disclosed fully in commonly assigned U.S. Pat. No. 4,007,471 issued to Edwin H. Land et al and hereby expressly incorporated by reference. Such a self-developing camera having a flash unit socket can accommodate an accessory holder adapted to have a portion inserted in the flash unit socket to mount the accessory holder on the camera while also providing a flash unit socket that is operatively connected to the camera socket when the holder is coupled to the camera. Thus, a positive vignetting accessory similar to that of FIGS. 1 and 5 may be inserted into such an accessory holder and divert a portion of the flash illumination produced by a lamp of a disposable flash unit to provide positive vignetting.

Thus, it will be appreciated that as a result of the present invention, a relatively simple snap-on positive vignetting accessory is provided by which the principal objective, among others, is comletely fulfilled. It is contemplated and will be aparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. A positive vignetting accessory for use with a camera having a lens assembly and a flash unit, comprising:

means for diverting and directing at least a portion of the illumination produced by said flash unit to said lens assembly in a predetermined pattern to effect positive vignetting, said means for diverting and directing are an integral unit formed of a light transmitting material including a polished light entering surface and a polished light exiting surface; and means for attaching said means for diverting and directing to said camera.

2. The invention of claim 1, wherein said means for diverting and directing and said means for attaching are an integral unit.

3. The invention of claim 2, wherein all of the surfaces of said means for diverting and directing other than said light entering and light exiting surfaces, respectively, are roughened.

4. The invention of claim 1, wherein the surface of said means for diverting and directing facing away from said lens assembly is reflective.

5. The invention of claim 4, wherein at least a portion of the surface of said integral unit facing away from said lens assembly is made white.

6. The invention of claim 1, wherein said camera includes a viewfinder window and wherein said means for diverting and directing icludes means for masking said viewfinder window to permit proper framing of a subject.

7. The invention of claim 1, wherein said camera includes a photocell window and wherein said means for diverting and directing includes means for blocking the passage of the diverted portion of said flash illumination to said photocell window.

8. A positive vignetting accessory for use with a camera having a lens assembly and a flash unit, comprising:

means including a reflective element for diverting at least a portion of the illumination produced by said flash unit toward the lens area of said camera;

means for receiving and directing at least some of said diverted portion of said flash unit illumination from said means for diverting into the lens of said camera in a predetermined pattern to effect positive vignetting, said means for receiving and directing comprises a light transmitting tube mounted over said camera lens; and means for attaching said means for diverting and said means for receiving and directing to said camera.

9. The invention of claim 8, wherein said light transmitting tube includes a tapered inner surface providing a reduced inner diameter adjacent said lens assembly.

10. The invention of claim 8, wherein the inner surface of said tube is fluted.

* * * * *